United States Patent [19]
Brenneisen et al.

[11] 3,935,528
[45] Jan. 27, 1976

[54] SELF-COMMUTATING INVERTER MEANS

[75] Inventors: Jörg Brenneisen, Mannheim; Arnold Schönung, Lindenberg, Pfalz, both of Germany

[73] Assignee: Brown, Boveri & Cie, A.G., Mannheim, Germany

[22] Filed: Mar. 15, 1974

[21] Appl. No.: 451,585

[52] U.S. Cl............................................. 321/45 C
[51] Int. Cl.².................................... H02M 7/44
[58] Field of Search................. 321/44, 45 R, 45 C

[56] References Cited
UNITED STATES PATENTS

| 3,207,974 | 9/1965 | McMurray | 321/45 C UX |
| 3,684,936 | 8/1972 | Graf | 321/45 C X |

FOREIGN PATENTS OR APPLICATIONS

| 68,553 | 8/1969 | Germany | 321/45 C |

Primary Examiner—R. N. Envall, Jr.
Attorney, Agent, or Firm—Herbert L. Lerner

[57] ABSTRACT

A self-commutating inverter having at least two main thyristors connected to a d-c source, a commutating arrangement consisting of an energy storage device and auxiliary thyristors connected anti-parallel to each other, a load and a firing control arrangement with outputs which are associated with the main and the auxiliary thyristors and can be impressed with firing pulses at presettable times, wherein the auxiliary thyristor associated as the commutation valve with the main thyristor to be relieved is triggered prior to the firing of the relieving main thyristor by a presettable time interval, and means to monitor the system.

1 Claim, 3 Drawing Figures

SELF-COMMUTATING INVERTER MEANS

This invention relates to self-commutating inverter means.

More particularly, the invention relates to an inverter system having voltage comparison means to monitor the system.

In one known self-commutating inverter, the commutating arrangement consists of a commutating capacitor, a commutating choke and two controlled commutating valves connected anti-parallel to each other. Each commutating valve is assigned to one of the two controlled valve branches of the inverter; these valve branches can be arranged as series as well as parallel circuits of several main thyristors.

To commutate the load current from one controlled valve branch to the other controlled valve branch, the commutation valves of the one controlled valve branch are triggered a definite time prior to switching-on the other controlled valve branch, so that the energy stored in the commutating capacitor is utilized in such a manner that first, the main thyristors of the valve branch to be extinguished carries a commutation current opposed to its forward direction and are thereby relieved, and that subsequently, the commutation current returns to the d-c supply via a return-current diode connected anti-parallel to the valve branch to be extinguished. In the known inverter, it is possible through the use of commutating valves to initiate the start of the commutation process at any time and to commutate the load current to the relieving valve branch.

However, it has been found that in case of major changes in the magnitude of the d-c supply voltage and/or the load current the energy stored in the commutating capacitor during the charging process is not always sufficient to supply a current large enough for extinguishing the valve branch. The changes in the magnitude of the d-c supply voltage and the load current mentioned can occur, for instance, if the d-c source used is a d-c current which is fed from an a-c system via a rectifier and in which a d-c voltage with high ripple is present, or if at the inverter output load currents larger than the nominal current occur, for instance, if the load impedance is lowered. Because of the small charge on the commutating capacitor, the quenching of the valve branch to be relieved is prevented and the d-c source of the inverter is short-circuited when the other valve branch fires, whereby the main thyristors are stressed with a pulse-like short-circuit current, which causes excessive heating of the main thyristors.

It is a principal object of the invention to provide a self-commutating inverter which makes safe commutation of the valve branches possible under any occurring operating conditions by changing the commutating capacitor to a degree always sufficient for quenching.

The problem is solved in inverters of the kind mentioned at the outset by providing a measuring arrangement, by means of which the signal of the actual value of the capacitor voltage can be determined; and by providing a device by means of which the actual-value signal of the capacitor voltage can be compared with a reference signal, and the time interval can be adjusted via the firing control as a function of the difference between the reference and the actual-value signal.

To implement the invention, it is proposed that the arrangement comprise circuit elements, comparison elements for comparing the reference and actual-value signals of the d-c supply voltage and/or the load current, as well as a summing arrangement for adding the actual value-reference difference signals.

In a preferred manner, the arrangement is connected with the control input of a firing-angle control common to the main thyristors and the auxiliary thyristors designed as commutation valves. One diode each is advantageously connected anti-parallel to each main thyristor or each controlled valve branch.

In one preferred example of an embodiment, the energy storage device is designed as a series resonant circuit consisting of a choke and the commutating capacitor. For the sake of simplicity, a single main thyristor is shown instead of the two controlled valve branches, each of which may consist of a series and/or parallel circuit without main thyristors.

With the invention the presettable time interval, by which the auxiliary thyristors are triggered prior to the firing of the relieving main valve, is adjusted in such a manner that at the time of the firing of the auxiliary valves the energy stored in the commutation arrangement is always sufficient for quenching the main thyristor to be relieved. Thereby, the inverter can be used also under extreme operating conditions without the danger that a short circuit of the supply voltage source could occur in case a main thyristor is not extinguished. It is, for instance, possible to use a rectifier with high output ripple as the d-c voltage source, whereby the expenditure for smoothing devices such as chokes, capacitors and filters can be reduced in an advantageous manner. The commutation devices consisting of auxiliary thyristors, chokes and/or capacitors as well as the main thyristors of the inverter can furthermore be designed for smaller ratings in inverters loaded with less than the nominal current.

Another object of the invention is to provide new and improved inverter means.

Another object of the invention is to provide new and improved inverter means having voltage measuring and summing means to control the system.

Another object of the invention is to provide new and improved inverter means having means to accommodate changes in the supply voltage.

Other features which are considered as characteristic of the invention are set forth in the appended claims.

Although the invention is illustrated and described herein as embodied in a particular embodiment, it is nevertheless not intended to be limited to the details shown, since various modifications may be made therein without departing from the spirit of the invention and within the scope and range of equivalents of the claims.

The construction and method of operation of the invention, however, together with additional objects and advantages thereof will be best understood from the following description of a specific embodiment when read in connnection with the accompanying drawings, in which.

Figure 1:
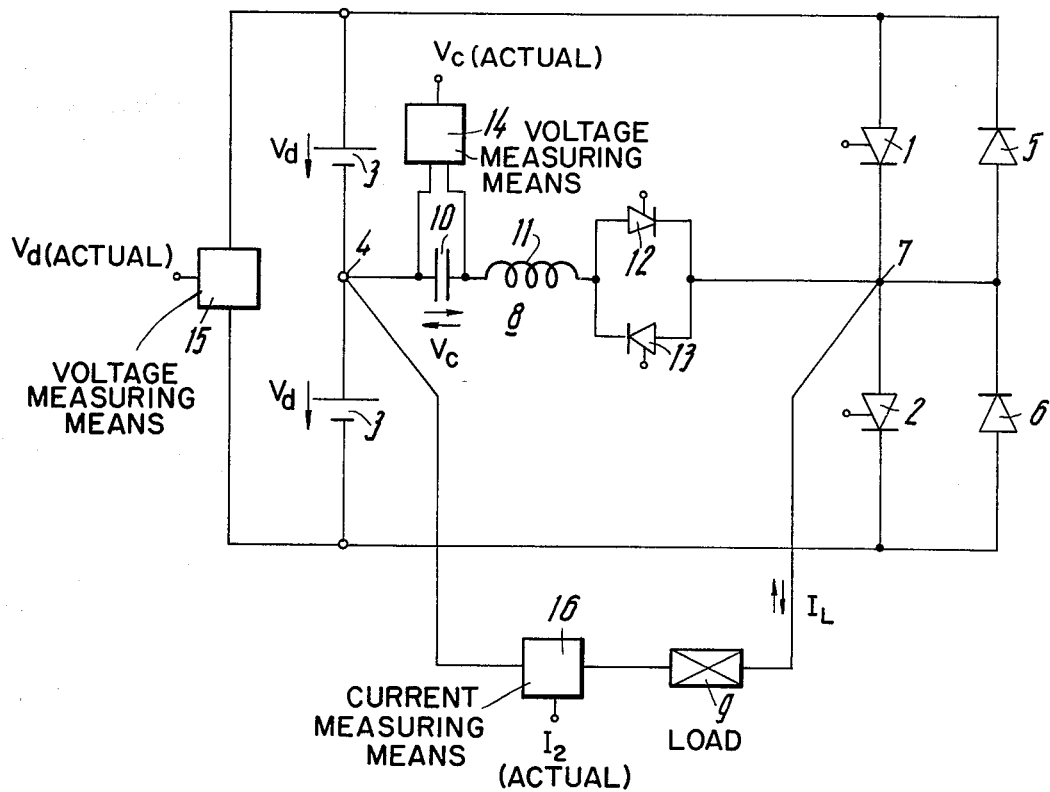
FIG. 1 is the schematic electrical circuit diagram of the self-commutating inverter with two main thyristors connected in series.

The self-commutating inverter shown in FIG. 1 comprises the main thyristors 1, 2 which are fed from a d-c voltage source 3 provided with a center tap 4. The main thryistors 1, 2, can also be replaced by series and/or parallel circuits of thyristors, depending on the power of voltage rating required. A return-current diode 5 or 6 is connected anti-parallel to each main thyristor 1, 2. The commutation arrangement 8 as well as the load 9 are connected between the connection terminal 7 of the two main thyristors 1, 2 and the center tap 4, of the d-c voltage source 3. The commutation arrangement 8 consists of the commutating capacitor 10, the commutating choke 11, and the two auxiliary thyristors 12, 13, which are connected anti-parallel to each other, and the firing of which initiates the commutation.

Figure 2:
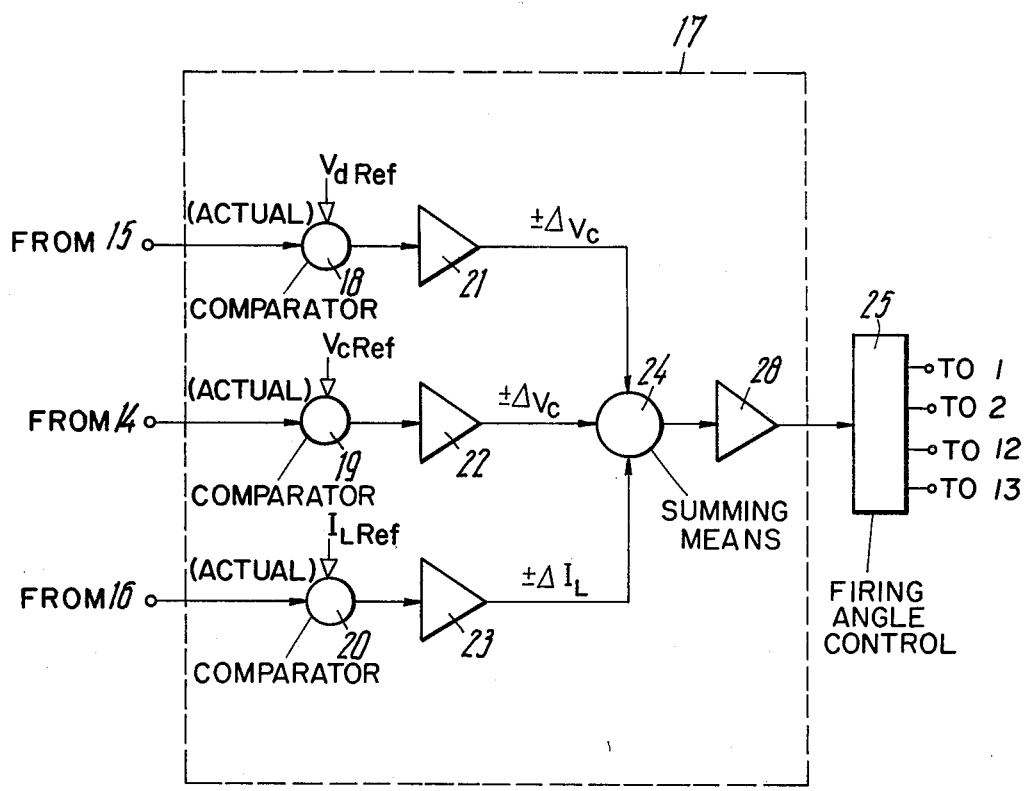
FIG. 2 is a signal flow diagram of an arrangement for adjusting the firing time of the auxiliary thyristors as a function of changes of the d-c supply voltage, the load current and the voltage at the capacitor.

Measuring devices, 14, 15 and 16, respectively, are provided for determining the voltage $V_C$ of the commutating capacitor 10, the d-c supply voltage $V_D$ as well as the a-c load current $I_L$. The measuring devices 14, 15, 16 feed the measured values of $V_C$, $V_D$, and $I_L$, present to a control means 17 which evaluates and processes the measured data. The device 17 is described in detail in FIG. 2.

The outputs of the measuring devices 14, 15, 16, shown in FIG. 1 are connected to three inputs of the control device 17, (FIG. 2) and each lead to a comparator element 18, 19, 20, which simulataneously perform a comparison of the actual-value signals determined by the measuring devices 14, 15, 16, with the corresponding reference signals. The desired-value or reference signals are generated by adjustable d-c voltage sources (not shown), advantageously by means of potentiometers. The difference signal $\Delta V_C$, $\Delta V_D$ and $\Delta I_L$, formed at the outputs of the comparator elements 18, 19 and 20, are amplified by the amplifiers 21, 22, 23 and fed to a common summing device 24. The operation of the summing device 24 ensures that change signals that may occur in opposing directions cancel each other if the three actual-value signals change simultaneously partly in a positive and partly in a negative direction.

The output signal of the summing device 24 is fed via an amplifier 28 to the control input of a firing angle control 25, which controls the main thyristors 1, 2, as well as the auxiliary thyristors 12, 13, and has corresponding outputs for the thyristors named.

Figure 3:
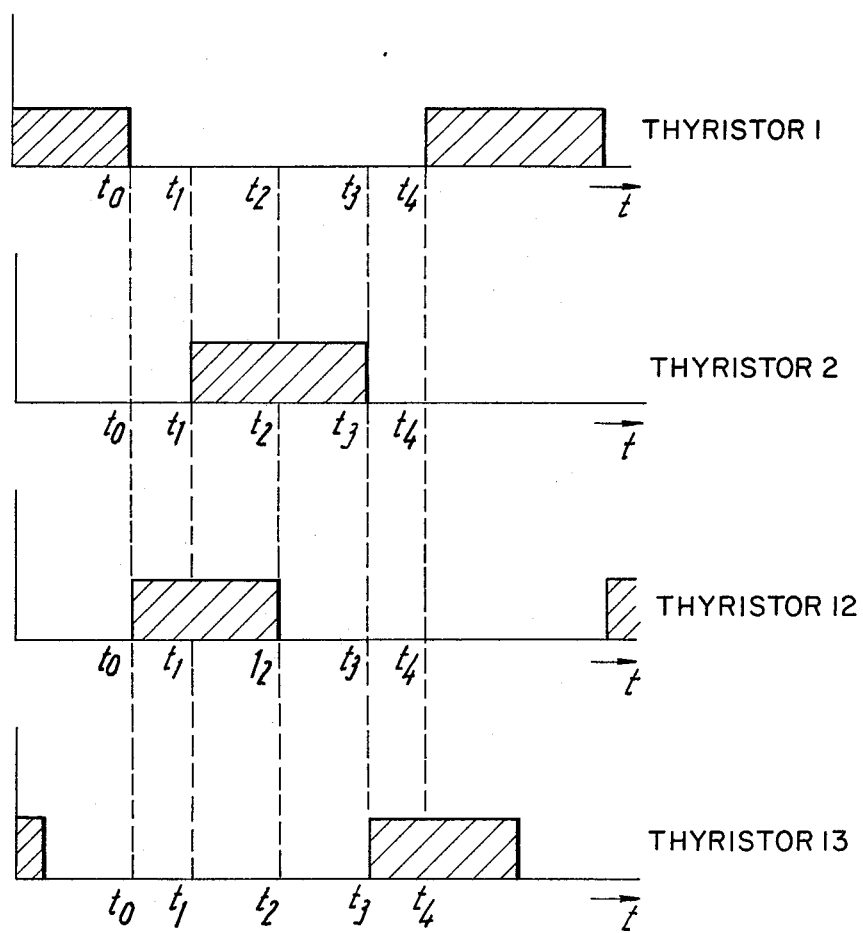
FIG. 3 is a firing pulse diagram for the main thyristors of the inverter according to FIG. 1.

The operation of the firing angle control 25 will be explained, referring to a firing-pulse diagram according to FIG. 3.

Prior to the time $t_0$ the main thyristor 1 conducts, so that the load current $I_L$ flows from the positive terminal of the d-c voltage source 3 to the center tap 4 of the d-c voltage source 3 via the main thyristor 1, the terminal 7 and the load 9 (FIG. 1.)

At the time $t_0$ the firing pulses for the main thyristor 1 are switched off and the auxiliary thyristor 12 is fired. Thereby, the commutating capacitor 10 discharges in a direction opposite that of the load current $I_L$ via the choke 11, the commutation valve 12, the terminal 7, the still conducting main thyristor 1, the d-c voltage source 3 and the center tap 4 and drives a sinuoidal commutation current in a direction opposed to that of the load current $I_L$, whereby the main thyristor 1 is extinguished and the load current $I_L$ is reduced to the value zero. After the main thyristor 1 is extinguished, the commutation current continues to flow in the same direction via the return-current diode 5.

At the time $t_1$ the main thyristor 2 fires, whereby the direction of the load current $I_L$ is reversed and flows from the center tap 4 and of the d-c voltage source 3 via the load 9, the terminal 7, and the main thyristor 2, to the negative terminal of the d-c voltage source 3. At time $t_2$ the thyristor 12 is switched off.

At the time $t_3$ the firing pulses for the main thyristor 2 are switched off, similarly as at time $t_0$, and the corresponding auxiliary thyristor 13 is fired. At the time $t_4$ the main thyristor 1 is then fired again.

During the period of current flow of the commutation current within the time interval between $t_2$ and $t_1$, and $t_4$ and $t_3$, respectively, the commutating capacitor 10 reverses its charge from its positive peak value $+V_C$ to its negative peak value $-V_C$ and is thereby charged with the correct polarity for the following commutation of the load current $I_L$ from the main thyristor 2 to the main thyristor 1. Due to the adjustment of the time interval, according to the invention, as a function of changes of the capacitor voltage VC the d-c supply voltage $V_D$ and the load current $I_L$, the period of the charge reversal of the commutating capacitor 10 is under any operating conditions at least as long as the capacitor voltage $+V_C$ or $-V_C$, respectively, has the value necessary for commutation.

We claim:

1. In a self-commutating inverter having a pair of main thyristors connected in series with each other and to a d-c source, commutating means comprising a capacitor energy storage means connected between a center tap on the d-c source and a pair of auxiliary thyristors connected anti-parallel to each other, the other ends of said pair of auxiliary thyristors being connected to a common point between said main thyristors, a load connected between the center tap of said d-c source and the connection of said two main thyristors, means to adjust the firing of the transistor in response to varying operating conditions comprising firing control means having outputs which are connected to the main and auxiliary thyristors to trigger said thyristors with firing pulses at presettable times whereby the auxiliary thyristor connected as the commutation valve with a main thyristor is triggered prior to the firing of the main thyristors by a presettable time interval, comprising a first voltage measuring device connected across the capacitor by means of which the actual-value signal of the capacitor voltage is determined, first comparison means connected to said first voltage measuring means to compare the actual-value signal to a reference signal, second and third comparison means for comparing reference and actual signals of the d-c supply voltage and the load current, and summing means connected to said comparison means for summing the difference between actual value-reference capacitor voltages, d-c source voltages and the load current, said firing control means being connected to said comparison means whereby the firing time intervals can be adjusted by said firing control means, as a function of the difference between reference signals and the actual measured signals.

* * * * *